United States Patent [19]
Palmer

[11] Patent Number: 5,251,654
[45] Date of Patent: Oct. 12, 1993

[54] FLOW REGULATOR ADAPTABLE FOR USE WITH EXHAUST FROM A PROCESS CHAMBER

[76] Inventor: David Palmer, 200 Berkeley Rd., North Andover, Mass. 02174

[21] Appl. No.: 850,767

[22] Filed: Mar. 13, 1992

Related U.S. Application Data

[63] Continuation-in-part of Ser. No. 669,746, Mar. 15, 1991, abandoned, which is a continuation-in-part of Ser. No. 405,835, Sep. 11, 1989, Pat. No. 5,000,221, which is a continuation-in-part of Ser. No. 178,505, Apr. 7, 1988, abandoned.

[51] Int. Cl.$^5$ .............................................. G05D 7/01
[52] U.S. Cl. ..................................... 137/501; 137/503
[58] Field of Search ............... 137/500, 501, 502, 503, 137/487.5, 505.38

[56] References Cited

U.S. PATENT DOCUMENTS

| | | | |
|---|---|---|---|
| 2,803,261 | 8/1957 | Carlson | 137/114 |
| 2,868,225 | 1/1959 | Wigham et al. | 137/503 |
| 2,899,973 | 8/1959 | Carlson | 137/505.41 |
| 2,918,933 | 12/1959 | Boitnott | 137/502 |
| 3,053,272 | 9/1962 | Babson | 137/505.1 |
| 3,138,174 | 6/1964 | Gilpin | 137/503 |
| 3,237,616 | 1/1966 | Daigh | 137/283 |
| 3,312,241 | 4/1967 | Bryant | 137/599 |
| 3,605,788 | 9/1971 | Brown | 137/502 |
| 3,741,476 | 6/1973 | Travaglio | 236/87 |
| 3,766,933 | 10/1973 | Nicholson, Jr. | 137/116.3 |
| 3,806,027 | 4/1974 | Ginn et al. | 236/49 |
| 3,820,556 | 6/1974 | Millar et al. | 137/220 |
| 3,862,644 | 1/1975 | Emmons et al. | 137/486 |
| 3,900,045 | 8/1975 | Murrell | 137/505.38 |
| 3,978,883 | 9/1976 | Peterson | 137/489.5 |
| 4,039,124 | 8/1977 | Ginn et al. | 236/1 B |
| 4,092,998 | 6/1978 | Taplin | 137/471 |
| 4,250,914 | 2/1981 | Ferrentino | 137/501 |
| 4,250,915 | 2/1981 | Rikuta | 137/501 |
| 4,508,140 | 4/1985 | Harrison . | |
| 4,592,385 | 6/1986 | Semon | 137/505.1 |
| 4,732,190 | 3/1988 | Polselli | 137/119 |
| 4,791,956 | 12/1988 | Kominami et al. | 137/503 |
| 4,873,873 | 10/1989 | Day | 73/861.63 |
| 4,942,921 | 7/1990 | Haessig et al. | 165/16 |
| 5,005,636 | 4/1991 | Haessig | 165/16 |

FOREIGN PATENT DOCUMENTS

| | | |
|---|---|---|
| 532356 | 8/1931 | Fed. Rep. of Germany . |
| 957118 | 5/1964 | United Kingdom . |

*Primary Examiner*—Stephen M. Hepperle
*Attorney, Agent, or Firm*—Bromberg & Sunstein

[57] ABSTRACT

A regulator including a movably, preferably hingedly, mounted member having a distal face, exposed to a reference pressure, and a frontal face, exposed to fluid passing through the regulator. Attached to the member is a structure that variably impedes fluid flowing through the regulator. The amount that this structure impedes the fluid flow varies as a function of the difference between the pressure of fluid on the frontal face of the member and the reference pressure. The impeder may be an integral part of the piston extending into the path of the fluid flowing through the regulator, or it may be a separate structure attached to the piston. In one embodiment, this impeder includes segmented airfoils segment. Some airfoil segments are movable and attached to the piston, others are fixed. As the piston moves in response to changes in pressure differential across the piston, each movable segment is displaced with respect to its corresponding fixed segment. As the corresponding segments are further displaced with respect to each other, the impedance to flow increases. The movable airfoil segments may also be hingedly attached to the hingedly mounted piston. A restoring force exerts a force on the piston so as to tend to lessen the resistance on the fluid flow, and so that when there is no flow through the passageway the resistance is relatively low.

38 Claims, 9 Drawing Sheets

FLOW REGULATOR ADAPTABLE FOR USE WITH EXHAUST FROM A PROCESS CHAMBER

This application is a continuation-in-part of application Ser. No. 07/669,746 filed Mar. 15, 1991 (the "Parent Application"), now abandoned, which is a continuation-in-part of application Ser. No. 07/405,835 (the "Grandparent Application"), filed Sep. 11, 1989 and issued Mar. 19, 1991 as U.S. Pat. No. 5,000,221, which is a continuation-in-part of application Ser. No. 07/178,505, filed Apr. 7, 1988, now abandoned. Filed concurrently herewith are three applications for Process-Chamber Flow Control System, Flow Regulator Adaptable For Use With Process-Chamber Air Filter and Flow Control Valve With Venturi by the same inventor as the present invention and bearing Ser. Nos. 851,017, 852,084 and 851,016, respectively. All these applications are hereby incorporated herein by reference.

TECHNICAL FIELD

This invention generally relates to a device for regulating the flow of a fluid, in particular a gas, through the device.

BACKGROUND ART

In a heating, ventilating, and air conditioning (HVAC) system, air flow is typically controlled using resistors to slow down the flow of air at different points to obtain the proper air balance throughout a building. These resistors may be comprised of gate valves, butterfly valves or dampers, and may be fixed, adjustable or motorized. When one resistor is adjusted, the pressure level throughout the HVAC system will change; any change in the HVAC system pressure will affect the flow of air past every other resistor. Thus, adjusting a resistor at the output causes "cross-talk." Previous attempts to solve the problem of air flow control have automated the resistors using microprocessors and servo-motors.

Municipal gas companies in the United States distribute gas through a network that is terminated with pressure regulators. In these gas distribution systems the pressure at the point of use is fairly independent of pressure changes throughout the distribution network. This can be accomplished because the distribution network is designed to withstand large pressures, and a large pressure drop can be caused at the point of use.

The approach, taken by gas companies, of providing a pressure regulator at the point of use has not been practical for the HVAC industry, because the HVAC industry moves very large quantities of air at very low pressure, and because the HVAC industry is usually more interested in controlling mass flow, not pressure. The comfort of the environment is determined by the thermal mass of hot and cold air that is moved.

Safety valves used in the gas industry, and in other fields involving the handling of fluids under high pressure, open or close only in extreme situations where a large rise or drop in pressure poses a danger. (Gas companies have safety valves that shut off the flow of gas when there is a large decrease in pressure, since such a decrease may be due to a leak downstream of the valve. Many safety valves vent fluid from a conduit when there is a large increase in pressure in order to prevent the pressure in the conduit from increasing beyond the bursting point of the conduit, or beyond the capability of machinery connected to the conduit.) Other valves such as those used in gasoline pumps, also shut off flow automatically when the backpressure increases to a certain point, indicating that the tank being filled is full. These safety valves and gasoline-pump valves are designed to be either fully opened or fully closed, and are not designed to precisely regulate the fluid flow.

One of the most complex problems confronted by the HVAC industry is controlling process chambers, such as the clean rooms used in semiconductor integrated-circuit chip manufacturing, or the medical and biotechnology laboratories kept below atmospheric pressure to prevent potentially dangerous microbes from blowing out of the laboratories.

Clean room requirements dictate that the environment be kept at a constant temperature and humidity (typically within a few degrees and a few percent) and that the mass flow into and out of the environment be kept constant. Air is drawn out of a clean room in two ways: some of the air exits the room through process equipment and other work stations with fume hoods, and some air exits directly through vents. It is frequently important that a constant flow rate or a constant partial vacuum be maintained in the process equipment in order to minimize defects in the integrated circuit chips being manufactured and in order to ensure that noxious fumes do not leak from the process equipment or fume hoods and thereby endanger personnel working nearby. Air flowing from the process equipment can be treated at a central location and then can be exhausted to the outside. Air that flows through the clean room, but does not flow through the process equipment may be recycled through the clean room. Clean rooms are typically kept at a pressure slightly above atmospheric pressure, so that dust does not enter the clean room when the doors to the clean room are opened.

With regard to safety, medical and biotechnology laboratories have problems similar to those of integrated chip manufacturing areas. Improper vacuums or flow rates in fume hoods can expose personnel to dangerous microbes. Likewise, air flowing from fume hoods can be treated at a central location before being exhausted to the outside. These laboratories are frequently kept at a pressure slightly below atmospheric pressure, so that microbes do not accidentally blow out of the laboratories when the laboratory doors are opened.

DISCLOSURE OF INVENTION

The present invention solves the problems found in the prior art systems by providing a self-regulating flow control system. Compared to many of the prior art systems, the present invention in not complex and imparts very little resistance to flow during low flow situations.

The regulator includes a movably mounted piston having a distal face, exposed to a reference pressure, and a frontal face, exposed to fluid passing through the regulator. Preferably, the path of fluid passing through the regulator is substantially straight. It is also preferred that the regulator not be vented at any point between the input and output of the regulator, so that the mass of fluid exiting the regulator is the same as the mass entering the regulator.

Attached to the piston, is a member that variably impedes fluid flowing through the regulator. The amount that this member impedes the fluid flow varies as a function of the difference between the pressure of fluid on the frontal face of the piston and the reference pressure. This member may be an integral part of the piston extending into the path of the fluid flowing through the regulator, or it may be a separate member attached to the piston.

In a preferred embodiment of the invention, this impeding member includes an airfoil segment or several such segments. Each airfoil segment that is movable and attached to the piston has a corresponding airfoil segment that is not movable, so that there are pairs of airfoil segments—each pair having a movable segment and a fixed segment, and each pair forming a complete airfoil. As the piston moves in response to changes in pressure differential across the piston, each movable segment is displaced with respect to its corresponding fixed segment. As the corresponding segments are further displaced with respect to each other, the impedance to flow increases. In this embodiment, as well as other, simpler embodiments, the piston may be hingedly mounted. The movable airfoil segments may also be hingedly attached to the piston.

A restoring force exerts a force on the piston so as to tend to lessen the resistance on the fluid flow, and so that when there is no flow through the passageway the resistance is relatively low. In a preferred embodiment, the restoring force includes the weight of the piston. In other embodiments, a spring may be used to apply or adjust the restoring force.

Preferably, the piston and the impeding member are mounted so as to move in a direction transverse to the direction of fluid flowing past the frontal face of the piston. It is also preferable that the impeding member is mounted downstream of the frontal face of the piston. In one embodiment of the invention, a variable resistance valve is located upstream of the frontal face of the piston, and the reference pressure is the pressure of fluid upstream of the variable resistance means.

The reference pressure may be the same as the environment that the fluid flows from, or alternatively it may be the same as the pressure somewhere else upstream of the piston or the variable resistance valve.

In another embodiment, a venturi is disposed in the fluid path. At least part of the venturi is formed with the frontal face of a piston. The piston is movably mounted so that it may move transversely to the flow through the path, and so that as the velocity of the fluid flowing through the path increases, the difference between the reference pressure and the pressure in the venturi increases causing the piston to move in a direction narrowing the venturi. A restoring force is exerted on the piston in the direction that tends to move the piston so as to widen the venturi.

BRIEF DESCRIPTION OF THE DRAWINGS

in FIG. 7A there is little or no flow through the regulator, and in FIG. 7B there is a greater flow.

DESCRIPTION OF SPECIFIC EMBODIMENTS

Figure 1:
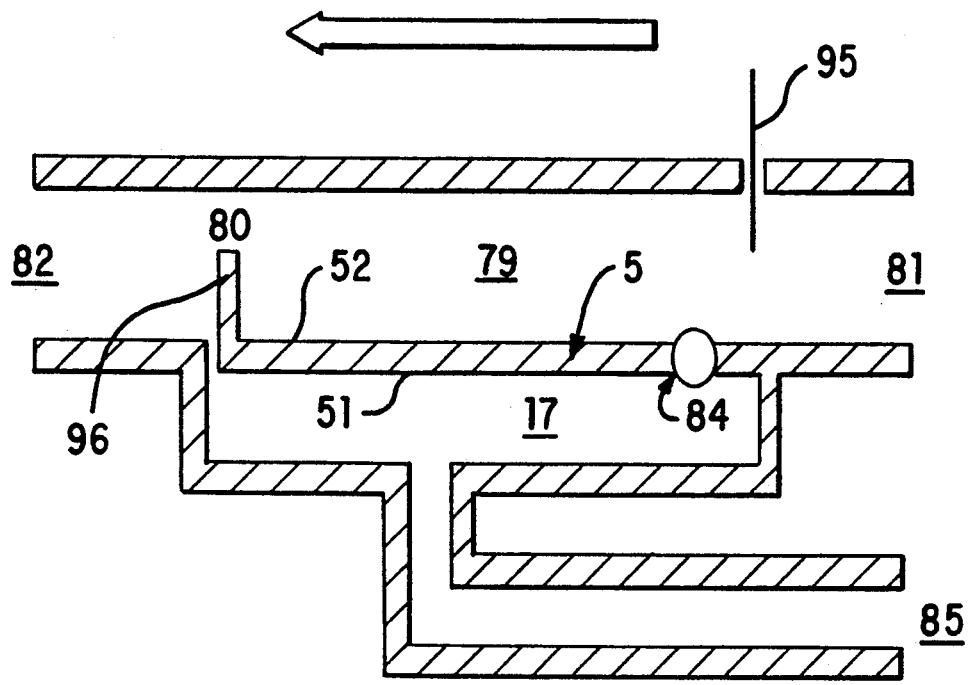
FIGS. 1, 2, 3 and 4 show cross-sections of several regulators according to the invention.

FIG. 1 shows a mass flow regulator according to the present invention. Air flows from the input 81, past a variable resistor, which in this case is a gate valve 95, into a chamber, called the plenum 79. Air moves over the frontal face 52 of the piston 5. The air flow is then modulated by constriction point 80, which is formed by the upturned section 96 at the end of piston 5. The piston 5 rotates about hinge 84, so that member 96 moves in a direction transverse to the air flow. Preferably, the output 82 is connected to a vacuum source, but in any case the pressure at the output 82 must be lower than the pressure at the input 81.

Figure 4:
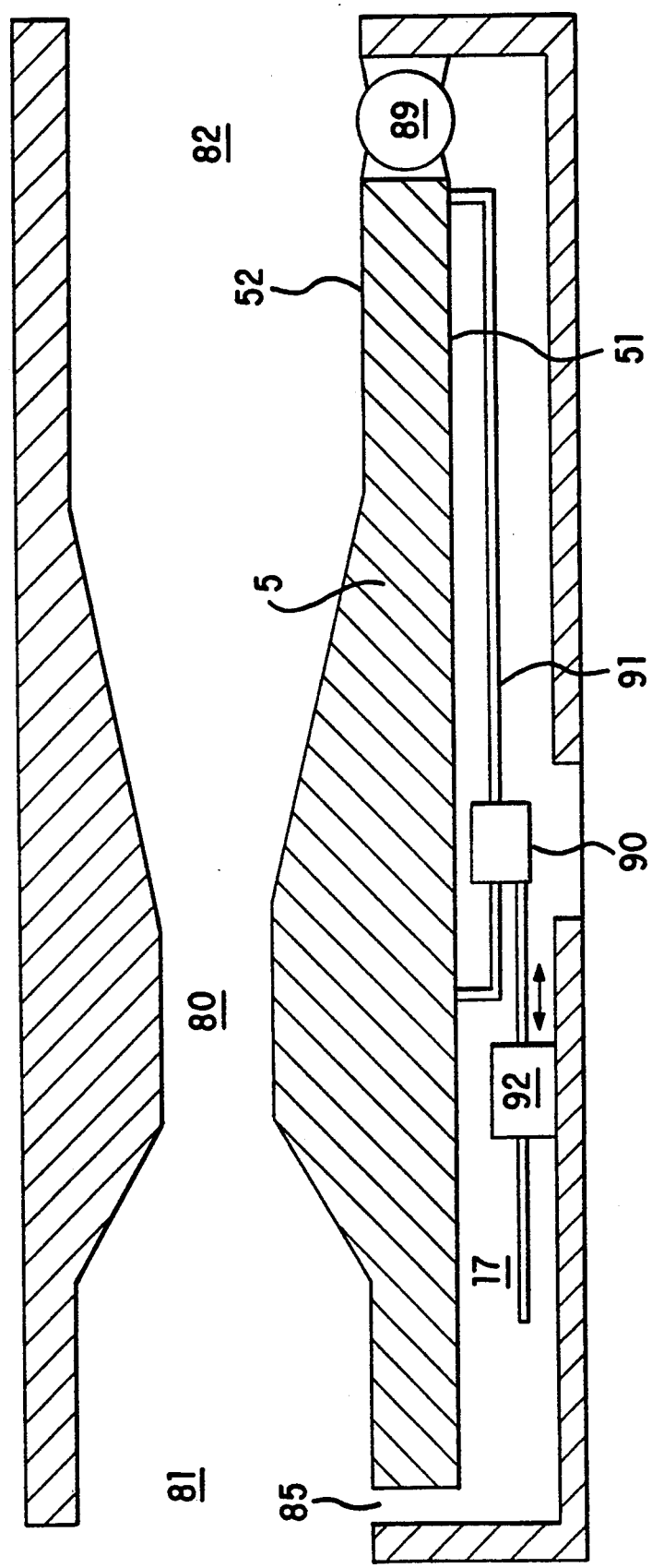

The pressure in the plenum 79 is related to the fluid forces on the frontal and distal faces, 52 and 51, of the piston 5, and the restoring force on the piston 5. In the device shown in FIG. 1, the downward restoring force is caused by the weight of the piston 5. Restoring force may also be supplied or modified by a spring, and/or, as shown in FIG. 4 below, by a slidable weight. The restoring force tends to open the constriction point 80. The restoring force balances the force caused by the pressure differential between the plenum 79, through which the air flows, and the reference-pressure chamber 17 (which should have a higher pressure than the plenum 79 does), so that the piston 5 floats. One may alter the pressure differential between the plenum 79 and the chamber 17 by altering the restoring force on the piston 5, such as by using the slidable weight system shown in FIG. 4 below. It is important that the vacuum at the output 82 be strong enough to cause the piston 5 to float; without a sufficiently strong vacuum the regulator will not be able to maintain a constant pressure in the plenum 79. With a sufficiently strong vacuum, the pressure in the plenum 79 will remain constant if the restoring force remains constant and the pressure in the chamber 17 remains constant. The chamber 17 is in fluid communication with the reference port 85, which may be connected to the environment from which fluid flows to the input 81.

If the pressure at the output 82 decreases, more fluid would tend to flow from the plenum 79 past the constriction point 80 to the output, which in turn would cause the pressure in the plenum 79 to drop, except a drop in the plenum pressure causes the piston 5 to rotate up and throttle the flow of fluid through the constriction point 80. Likewise, an increase in pressure at the output 82 causes the constriction point to widen. In this way, as long as there is a sufficient vacuum at the output 82 to compensate for the downward restoring force on the piston 5, the pressure in the plenum 79 remains a constant amount less than the reference pressure and independent of the pressure at the output.

Thus, the plenum 79 acts as a constant vacuum sink drawing in fluid flowing from input 81 past the gate valve 95, which acts as a resistor. If the differential pressure between input 81 and plenum 79 remains constant, and the resistance to flow between input 81 and plenum 79 remains constant, the fluid mass flow rate will remain constant. The mass flow rate may be changed by changing the resistance to fluid flow caused by the gate valve 95. A constant pressure differential between the input 81 and the plenum 79 can be maintained by venting the reference chamber 17 to the input 81, which is accomplished by connecting reference port 85 to the input 81. Adjusting the gate valve 95 causes more or less fluid to flow into plenum 79, and the piston 5 and impeding member 96 will move down or up to modulate the pressure in the plenum 79. By connecting the reference port 85 to the input 81, a change in the input pressure will cause a corresponding change in the pressure of chamber 17, which in turn will cause the piston 5 to move and either widen or narrow the constriction point 80 to maintain a constant pressure differential between the plenum 79 and the input 81. By combining variable resistor 95 with a regulator that maintains a constant pressure differential across the variable resistor 95, the device shown in FIG. 1 performs very well as a mass flow controller.

Figure 2:
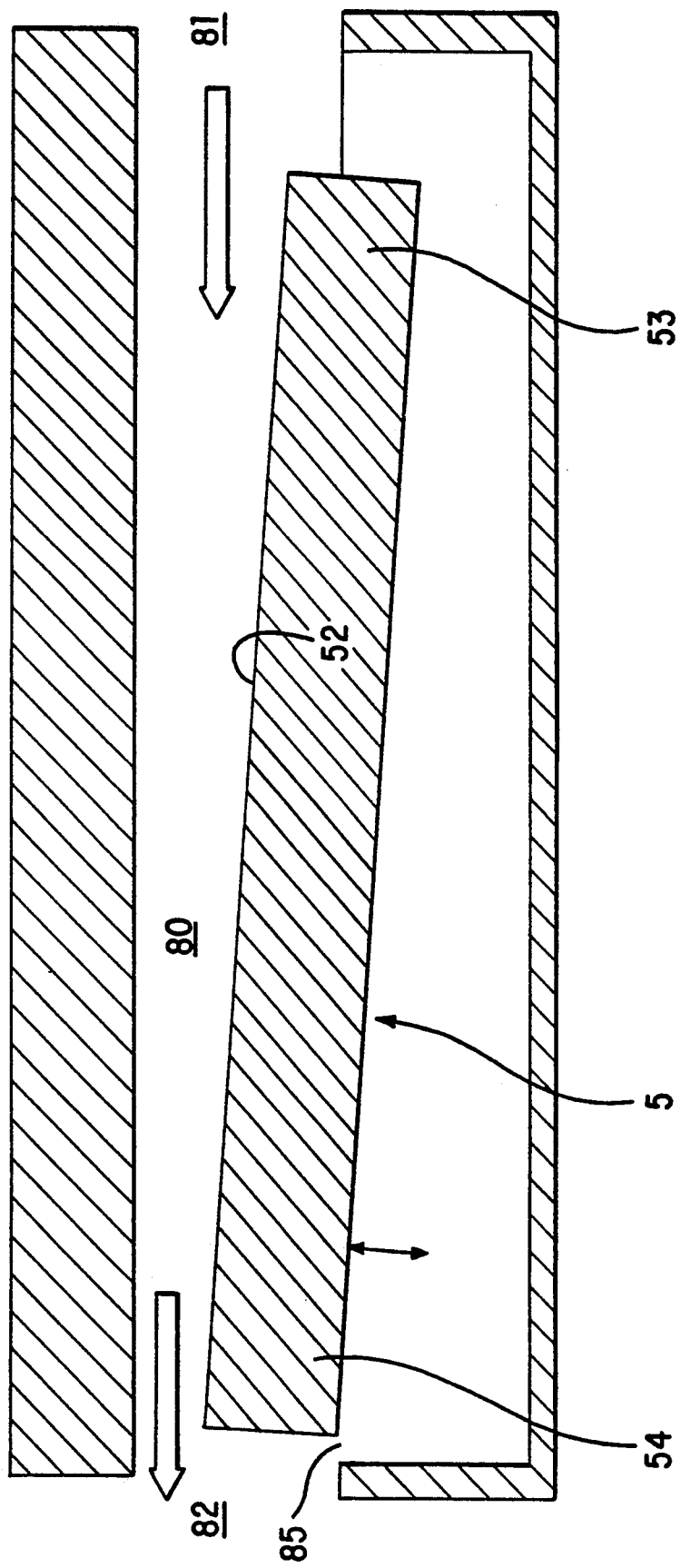

FIG. 2 shows another embodiment of the invention. In this version, a venturi 80, which is formed in part by the top (frontal) face 52 of the piston 5, does not gradually widen as the venturis shown in FIGS. 3 and 4 below. The port 85 in this version is located at the output 82 of the device. The piston is pivotally mounted at one end 53, while the other end 54 constricts the flow of fluid.

Figure 3:
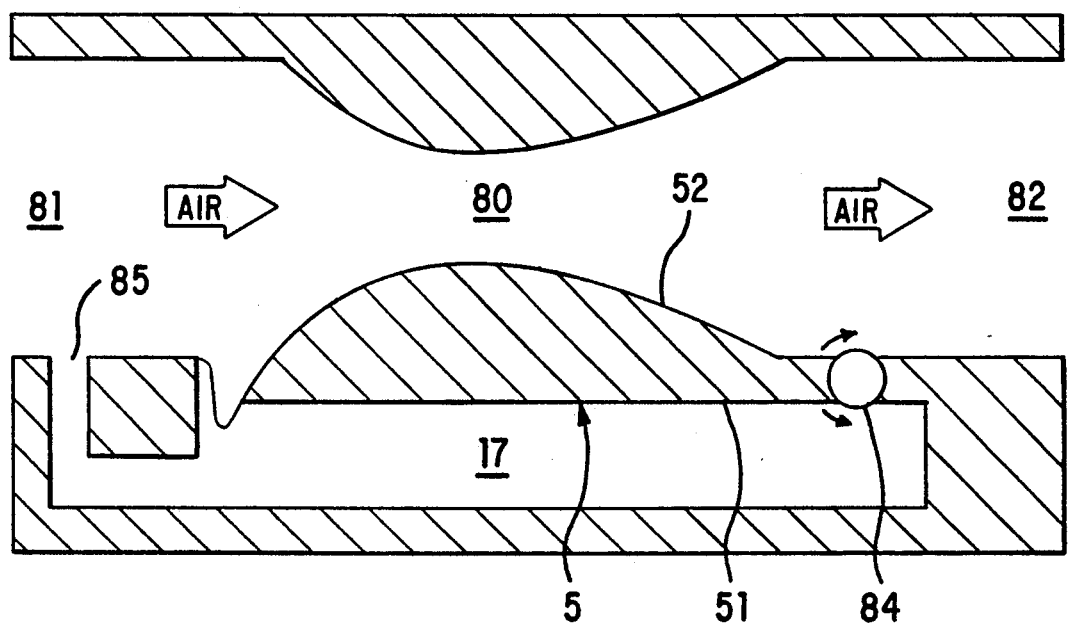

FIG. 3 shows another mass flow regulator. In this device fluid flows from the input 81, through a venturi valve 80 that gradually narrows and widens the fluid passageway, to an output 82. Part of the venturi is made of a movable piston 5, which may move up to narrow the venturi or move down to widen the venturi. Preferably, the piston 5 is attached to the body of the device by a hinge 84 located near the output 82 of the device. The lower face of the piston 5, the distal face 51, is exposed to a chamber 17 having a reference pressure. This chamber 17 is vented to the input 81 by means of a port 85, such that the reference pressure is equal to the pressure of the fluid at the input 81. As the fluid flows through the device, the pressure in the venturi decreases because of the Bernoulli effect. This causes the piston 5 to tend to move up to narrow the venturi. The weight of the piston 5 tends to pull the piston downward. Another means of exerting a restoring force on the piston 5 would be with a spring. The force exerted by the weight of the piston, or other restoring force, balances with the force caused by the pressure differential between the chamber 17 and the venturi 80, causing the piston to float (assuming the velocity of the fluid is great enough). As the velocity of the fluid increases, the pressure in the venturi, 80 will further decrease causing the piston to rise further. Thus, the cross-sectional area of the venturi 80 decreases. Since the mass flow rate of the fluid is equal to the product of the fluid's density, the cross-sectional area of the pathway and the velocity of the fluid, the mass flow rate remains fairly constant, i.e., the increased velocity is offset by the decreased cross-sectional area.

FIG. 4 shows a modified version of the FIG. 3 device, wherein the device can be adjusted to attain various mass flow rates. This is done by using a slidable mass 90. The further to the left and away from the hinge 84 the mass 90 is located, the greater the tendency of the piston to move down and widen the venturi. The further to the right and closer to the hinge 84 the mass 90 is placed, the greater the tendency of the piston to rise and narrow the venturi. Thus, the desired mass flow rate can be increased by moving the mass 90 to the left, or decreased by moving the mass to the right. The movement of the mass can, of course, be accomplished manually; however, it can also be accomplished remotely by using a servo-motor 92 which can move the mass 90 back and forth. The servo-motor can then be controlled electrically.

Figure 5:
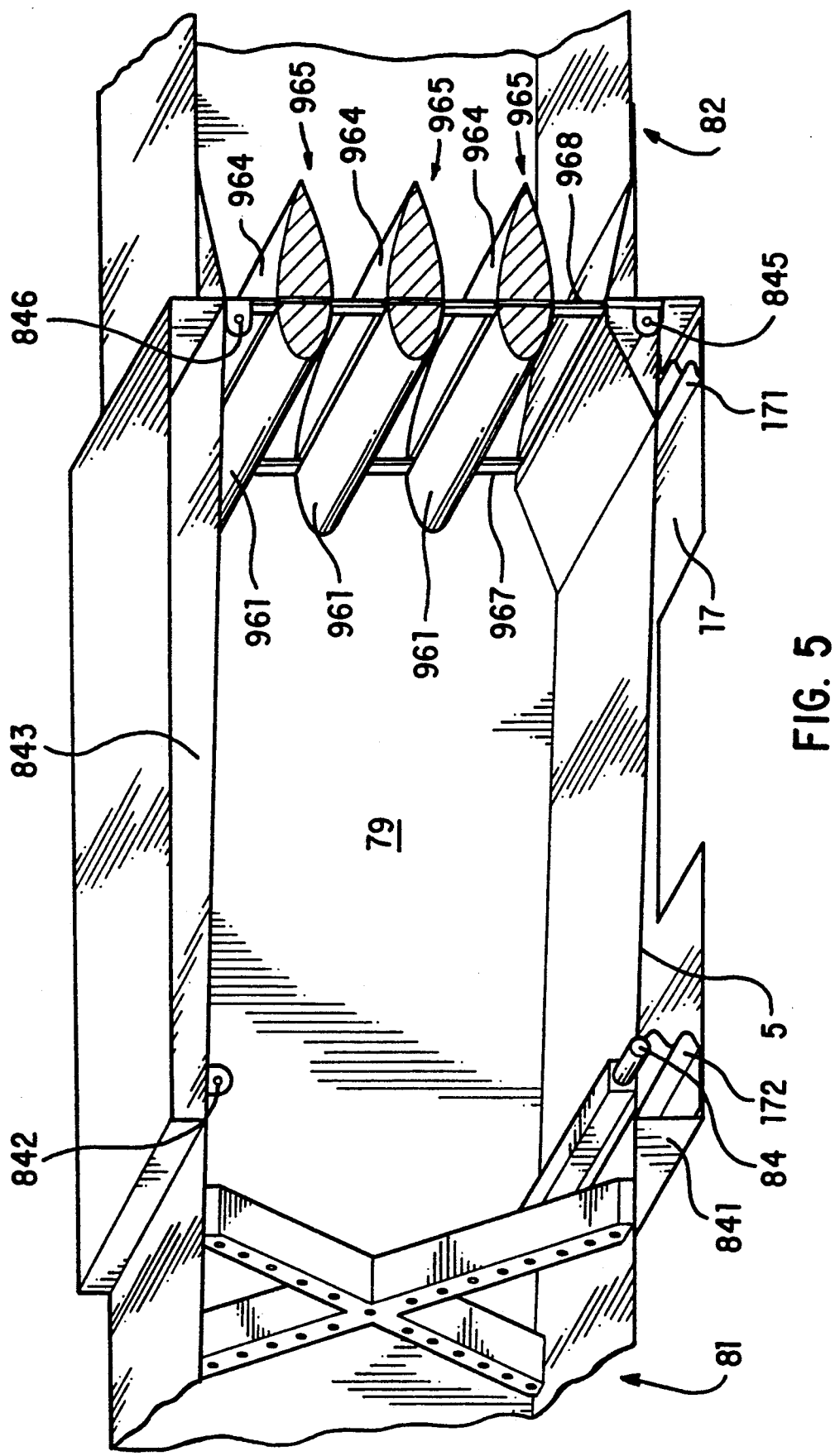
FIG. 5 shows a perspective view of a regulator that is an embodiment of the invention having several airfoils, wherein the near wall of the regulator has been removed to expose the interior of the regulator.
Figure 6:
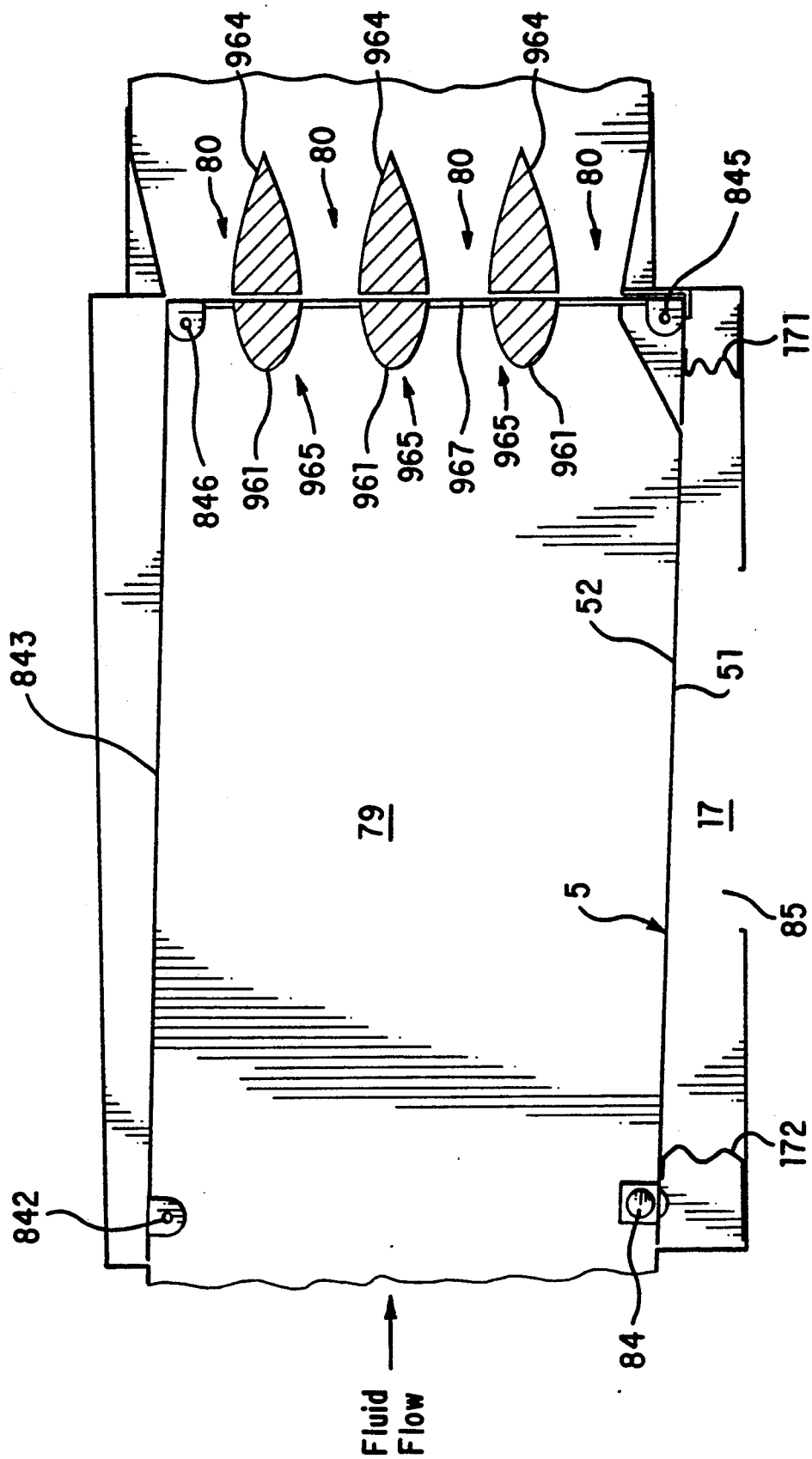
FIG. 6 shows a cross-section of the regulator shown in FIG. 5.

FIGS. 5 and 6 are different perspectives of a preferred embodiment of the invention that has three airfoils 965 mounted in the path of the air flow. The airfoils 965 are divided into upstream segments 961 and downstream segments 964. The upstream segments 961 in this embodiment are movable, whereas the downstream segments 964 are fixed to the walls of the fluid conduit. The upstream segments 961 are rigidly attached to each other by rods 967 and 968, which in turn are hingedly attached at their lower ends to piston 5 at hinge point 845. The piston 5 in this device, like the pistons of the devices shown in FIGS. 1-4, is hingedly mounted so that it rotates about point 84. The upper ends of rods 967 and 968 are also hingedly attached at hinge point 846 to upper member 843, which in turn is hingedly mounted so that it rotates about point 842. Because of these hinge connections, 84, 842, 845 and 846, the upper member 843 moves in parallel with piston 5. From the perspective shown in FIG. 6, the piston 5, the upper member 843 and the rods 967 and 968 appear as three sides of a parallelogram with varying angles.

The piston 5 in the device shown in FIGS. 5 and 6 is like the pistons shown in FIGS. 1-4 in most respects. The frontal face 52 of the piston 5 is exposed to the air in the plenum 79, and its distal face 51 is exposed to air in the reference chamber 17, and pivots up and down depending on the pressure differential between the plenum 79 and the reference chamber 17. As the piston 5 pivots up and down, air flowing through the device is more or less constricted. The reference chamber 17 has flexible membranes 171 and 172 mounted at its edges to prevent an undue amount of air from flowing from the reference chamber 17 around the hinge points 84 and 845 into the plenum 79, which is normally at a lower pressure than the reference pressure when fluid is flowing through the device.

Figure 7:
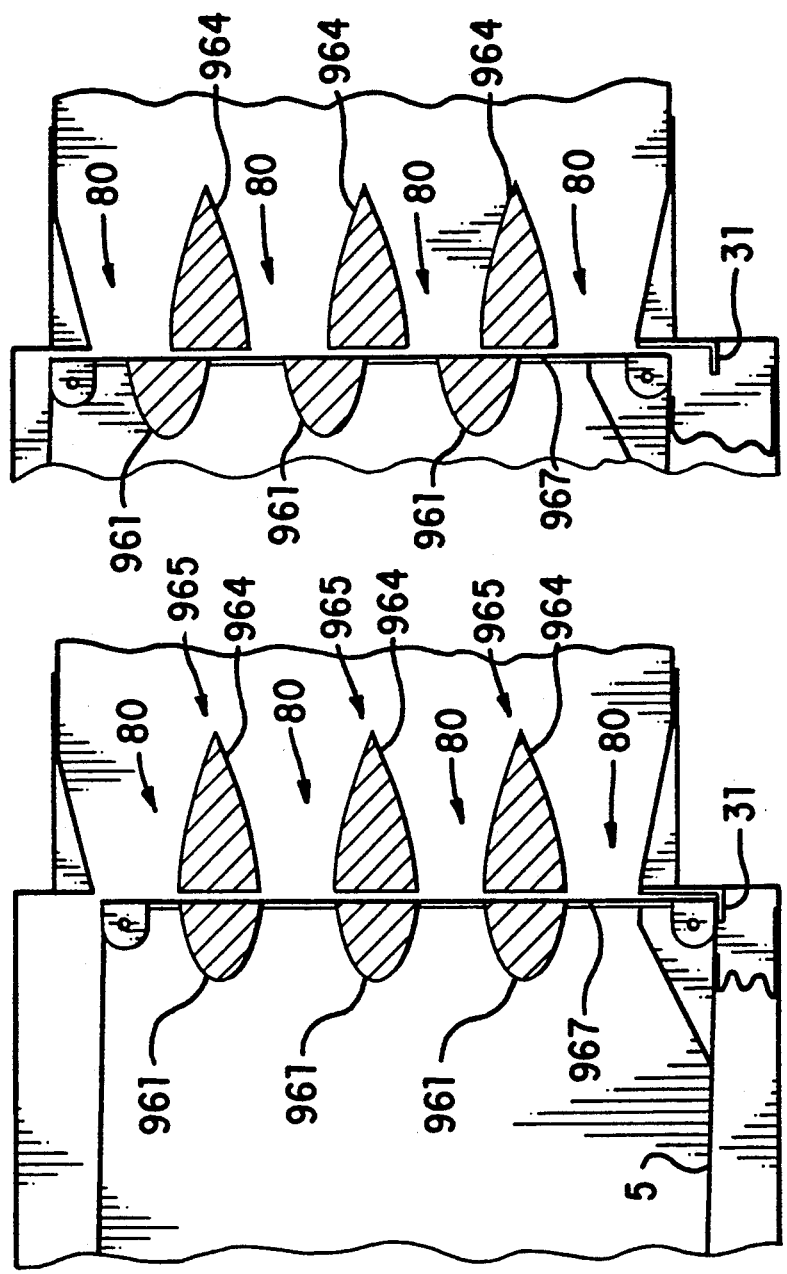
FIGS. 7A and 7B show a cross-section of a portion of the regulator shown in FIG. 5.

The device shown in FIGS. 5 and 6 has four constriction points 80, whereas the devices shown in FIGS. 1-4 have only one constriction point 80. FIGS. 7A and 7B show how the upstream segments 961 are displaced with respect to downstream segments 964, so as to narrow the constriction points 80. As the piston 5 rises, it causes rods 967 and 968 (rod 968 is not shown in FIGS. 7A and 7B) to move up, which, in turn, causes the upstream segments 961 of the airfoils 965 to rise. The downstream segments 964 are fixedly attached to the walls of the conduit and thus do not move. As segments 961 and 964 are displaced with respect to each other, the constriction points 80 narrow, and the impedance on the air flow increases.

In an alternative embodiment, the upstream segments 961 are fixedly attached to the conduit walls and the downstream segments 964 are attached to the piston 5 by means of rods 967 and 968. The effect on fluid flow in this alternative embodiment is similar to that of the embodiment shown in FIGS. 5, 6, 7A and 7B: when the piston 5 rises, the airfoil segments 961 and 964 are displaced with respect to each other, and the constriction points 80 are narrowed.

Instead of dividing the airfoils into only two segments, each airfoil may be divided into three segments, upstream, middle and downstream segments, wherein the upstream and downstream segments are fixedly attached to the conduit walls, and the middle segment is movable. Alternatively, some smaller portion of each airfoil may be displaceable from the rest of the airfoil so as to extend from the top of the airfoil and occlude the constriction point above the airfoil.

Figure 8:
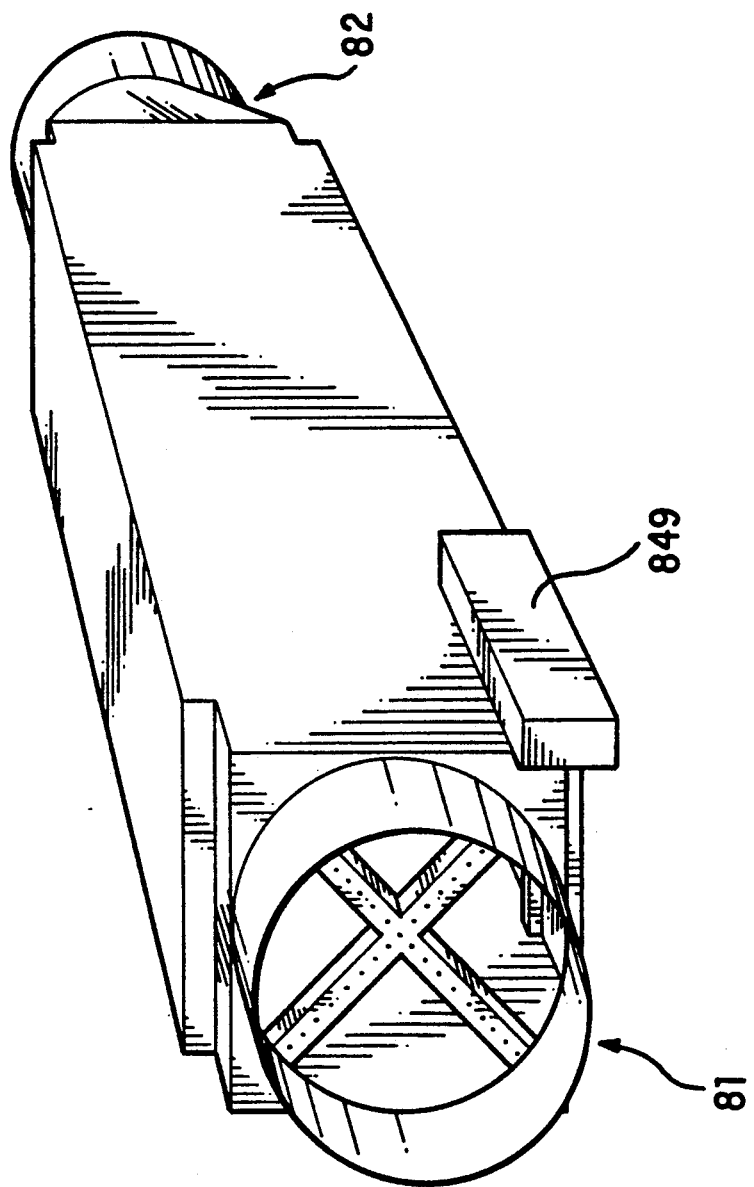
FIG. 8 shows a perspective view of the exterior of the regulator shown in FIG. 5.

The restoring force created by the weight of the piston may be modified in a manner similar to that shown in the flow regulator shown in FIG. 4, which uses a slidable mass 90. A guide arm 91, along which the mass is slid, may be attached to the extension 841 (shown in FIG. 5) at the pivot point 84. The mass 90 may be moved closer to or further from the pivot point 84 in order to alter the tendency of the piston 5 to move up or down. Preferably, the mass 90 is positioned by means of a servo-motor, which is controlled electrically from a remote location. This slidable mass apparatus may be located in a housing 849 located on the side of the regulator, as seen in FIG. 8. FIG. 8 shows the exterior of the regulator shown in FIGS. 5 and 6.

The use of airfoils as a way of impeding flow may be adapted for use in a device for regulating flow from a air source to a process chamber at a lower pressure, such as those devices shown in the concurrently filed application for Flow Valve Regulator Adaptable For Use With Process-Chamber Air Filter, in particular, the device shown in FIG. 5 of said concurrently filed application. The air foils are mounted upstream of the plenum. The piston is hingedly mounted over the plenum, so that, as the pressure in the plenum increases with respect to the reference (process chamber) pressure, the piston lifts a portion of the air foils, thereby increasing the impedance to the airfoil.

Figure 9:
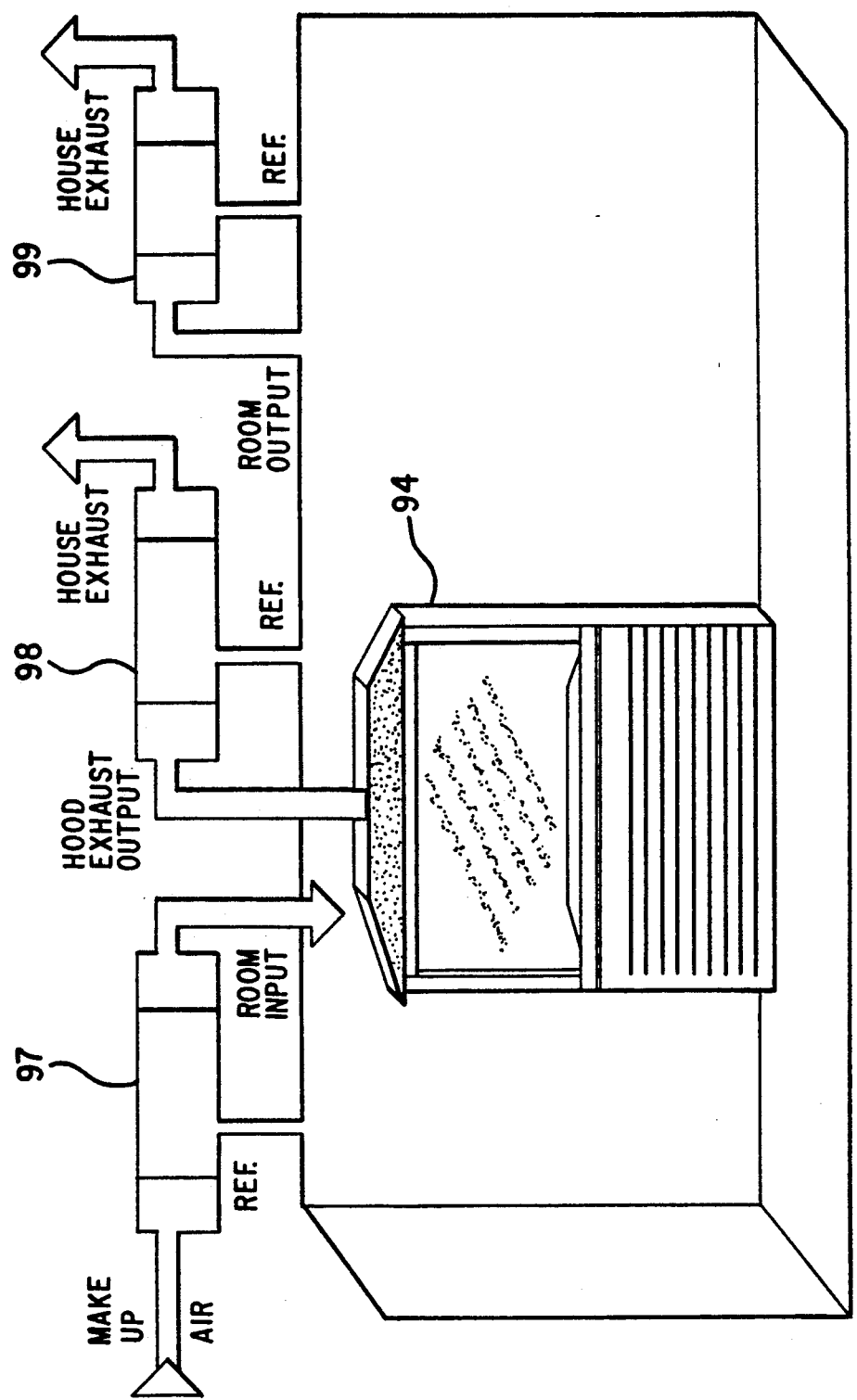
FIG. 9 shows how regulators according to the invention may be employed in regulating flow through a process chamber.

FIG. 9 shows how the regulators described hereinabove may be used to control the flow of air from a process chamber. Air enters the process chamber through one or more regulators 97, such as those shown in the concurrently filed patent application for Flow Regulator Adaptable For Use With Process-Chamber Air Filter or in FIG. 1 of the Parent Application, both of which are referenced hereinabove. The regulator shown in FIGS. 5 and 6 in the present application may be used as regulator 98 in the FIG. 9 system. The reference chamber 17 is connected to the process chamber so that the pressure in the process chamber is the reference pressure. The input 81 of the regulator 98 is attached to the fume hood 94, which draws noxious fumes. The regulator 98 maintains in the fume hood 94 a fairly constant vacuum relative to the process chamber (i.e., a lower pressure than the process chamber). Fume hoods frequently have doors that allow laboratory technicians access inside the fume hood 94. When these doors are opened, the regulator 98 controlling the relative vacuum in the fume hood 94 increases the air flow through the fume hood, thereby maintaining the vacuum in the fume hood 94.

Regulator 99 draws air directly from the process chamber, preferably at a constant mass flow rate. The regulator shown in FIG. 1, which has a gate valve 95 mounted upstream of the piston 5, may be used to control the mass flow rate. Likewise, the regulator shown in FIGS. 5 and 6 may be used to control the mass flow rate, if a throttling valve, such as gate valve 95 of the FIG. 1 regulator, is placed upstream of the piston 5. The regulators shown in FIGS. 2, 3 and 4 of the present application may also be used as the mass flow regulator 99 of the FIG. 9 system.

What is claimed is:

1. A device for regulating the flow of fluid through a passageway from an environment, where the fluid is substantially still, the device comprising:
    a conduit having a wall defining the passageway through the device;
    a hingedly mounted piston having a bottom face, exposed to the environment's pressure, and a top face, forming a portion of the conduit wall, directly over which fluid in the passageway flows;
    impedance means, attached to the piston downstream of the top face of the piston, for variably impeding fluid flowing through the passageway, so that the impedance means's impedance on the fluid flow varies as a function of the pressure differential across the piston; and
    restoring means, including the weight of the piston, for exerting a force on the piston so as to tend to cause the impedance means to lessen the impedance on the fluid flow, and so that when there is no flow through the passageway the amount that the impedance means impedes the flow is relatively low.

2. A device for regulating the flow of fluid through a passageway, the device comprising:
    a conduit having a wall defining the passageway through the device;
    a hingedly mounted piston having a bottom face, exposed to a reference pressure, and a top face, forming a portion of the conduit wall, directly over which fluid in the passageway flows;
    impedance means, including a gate attached to the piston downstream of the frontal face of the piston so that it extends upwards into the passageway, for variably impeding fluid flowing through the passageway at a construction point, so that the impedance means's impedance on the fluid flow varies as a function of the pressure differential across the piston, the piston and gate being mounted so that each moves in a direction transverse to the direction of fluid flowing through the constriction point; and
    restoring means, including the weight of the piston and the gate, for exerting a force on the piston so as to tend to cause the impedance to lessen the impedance on the fluid flow, and so that when there is no flow through the passageway the amount that the impedance means impedes the flow is relatively low; and
    variable resistance means for variably impeding the flow of fluid, wherein the variable resistance means is located upstream of the top face of the piston, and the reference pressure is the pressure of fluid upstream of the variable resistance means.

3. A device for regulating the flow of fluid through a passageway, the device comprising:
    a movably mounted piston having a distal face, exposed to a reference pressure, and a frontal face, directly over which fluid in the passageway flows;
    impedance means, attached to the piston downstream of the frontal face of the piston, for variably impeding fluid flowing through the passageway, so that the impedance means's impedance on the fluid flow varies as a function of the pressure differential across the piston, wherein the impedance means includes an airfoil having a movable portion and a fixed portion, such that the amount the movable portion is displaced with respect to the fixed portion varies as a function of the pressure differential across the piston; and restoring means, including the weight of the piston, for exerting a force on the piston so as to tend to cause the impedance means to lessen the impedance on the fluid flow, and so that when there is no flow through the passageway the amount that the impedance means impedes the flow is relatively low.

4. A device for regulating the flow of fluid through a passageway, the device comprising:

a movably mounted piston having a distal face, exposed to a reference pressure, and a frontal face, directly over which fluid in the passageway flows;

impedance means, attached to the piston downstream of the frontal face of the piston, for variably impeding fluid flowing through the passageway, so that the impedance means's impedance on the fluid flow varies as a function of the pressure differential across the piston, wherein the impedance means includes an airfoil that is divided into upstream and downstream segments that are displaceable with respect to each other, such that the amount the two segments are displaced with respect to each other varies as a function of the pressure differential across the piston; and restoring means, including the weight of the piston, for exerting a force on the piston so as to tend to cause the impedance means to lessen the impedance on the fluid flow, and so that when there is no flow through the passageway the amount that the impedance means impedes the flow is relatively low.

5. A device according to claim 4, wherein the restoring means further includes the weight of an airfoil segment.

6. A device according to claim 5, wherein the piston is pivotally mounted so that the piston rotates about a hinge point, and wherein the piston includes a slidable weight that may be moved closer towards or further from the hinge point so as to decrease or increase the force exerted by the restoring means.

7. A device for regulating the flow of fluid through a passageway, the device comprising:

a movably mounted piston having a distal face, exposed to a reference pressure, and a frontal face, directly over which fluid in the passageway flows;

impedance means, attached to the piston downstream of the frontal face of the piston, for variably impeding fluid flowing through the passageway, so that the impedance means's impedance on the fluid flow varies as a function of the pressure differential across the piston, wherein the impedance means includes an airfoil that is divided into upstream and downstream segments, the downstream segment being fixed and the upstream segment being displaceable, such that the amount the upstream segment is displaced varies as a function of the pressure differential across the piston; and restoring means, including the weight of the piston, for exerting a force on the piston so as to tend to cause the impedance means to lessen the impedance on the fluid flow, and so that when there is no flow through the passageway the amount that the impedance means impedes the flow is relatively low.

8. A device according to claim 7, wherein the restoring means further includes the weight of the upstream segment.

9. A device according to claim 8, wherein the piston is pivotally mounted so that the piston rotates about a hinge point, and wherein the piston includes a slidable weight that may be moved closer towards or further from the hinge point so as to decrease or increase the force exerted by the restoring means.

10. A device for regulating the flow of fluid through a passageway, the device comprising:

a conduit having a wall defining the passageway through the device;

a hingedly mounted piston having a frontal face, forming a portion of the conduit wall and directly exposed to fluid in the passageway, and a distal face exposed to a reference pressure, the piston being pivotable about a pivot point;

an airfoil having movable and fixed portions, the movable portion being hingedly attached to the piston at a point different from the pivot point, such that the amount the movable portion is displaced with respect to the fixed portion varies as a function of the pressure differential across the piston, and such that the movable portion variably impedes fluid flowing through the passageway; and restoring means for exerting a force on the piston so as to tend to lessen the impedance on the fluid flow, and so that when there is no flow through the passageway the impedance caused by the airfoil is relatively low.

11. A device according to claim 10, wherein the passageway is in communication with an environment, where the fluid is substantially still, and the reference pressure is equal to the pressure in the environment.

12. A device according to claim 10, further including a second airfoil having movable and fixed portions, the movable portion of the second airfoil being hingedly attached to the piston.

13. A device for regulating the flow of fluid through a passageway, the device comprising:

a conduit having a wall defining the passageway through the device;

a movably mounted piston having a frontal face, forming a portion of the conduit wall directly exposed to fluid flowing through the passageway, and a distal face exposed to a reference pressure;

an airfoil having first and second portion that are displaceable with respect to each other, the airfoil being connected to the piston such that the amount that the two portions are displaced with respect to each other varies as a function of the pressure differential across the piston, and such that the displacement of the two portions impedes fluid flowing through the passageway; and restoring means for exerting a force on the piston so as to tend to lessen the impedance on the fluid flow, and so that when there is no flow through the passageway the impedance caused by the airfoil is relatively low.

14. A device according to claim 13, wherein the passageway is in communication with an environment, where the fluid is substantially still, and the reference pressure is equal to the pressure in the environment.

15. A device for regulating the flow of fluid flowing from an input, attached to an environment, where the fluid is substantially still, to an output, attached to a vacuum source, the device comprising:

a path through which the fluid passes from the input to the output, the path being substantially straight and being bounded by a wall;

a piston having a frontal face forming a portion of the path wall, directly across which the fluid in the path flows, and a distal face exposed to the environment's pressure, the piston being hingedly mounted at a hinge point so that the piston may move in a direction transverse to the fluid path, and so that, when the difference between the reference pressure and the pressure in the path increases, the piston tends to move so as to narrow the path at a constriction point, the constriction point being downstream of the hinge point; and restoring means for exerting a force on the piston in a direction that tends to move the piston so as to widen the path.

16. A device according to claim 15, wherein the restoring means includes the weight of the piston.

17. A device according to claim 15, wherein the top and bottom faces have approximately equal areas.

18. A device for regulating the flow of fluid from an input to an output, the device comprising:

a path, through which the fluid passes from the input to the output, the path being defined by a wall and not being vented at any point between the input and the output, so that the mass of fluid exiting the device through the output is substantially equal to the mass of fluid entering the device from the input;

a hingedly mounted piston, having a hinge end and a constriction end, the piston being so mounted that the constriction end may constrict the path at a constriction point, and so that the constriction end may move in a direction transverse to the flow through the path at the constriction point, the piston having a distal face exposed to a reference pressure, and a frontal face forming a portion of the path wall exposed directly to the fluid flowing through the path; and restoring means for exerting a force on the piston in a direction that tends to move the piston so as to widen the path at the constriction point.

19. A device according to claim 18, wherein the restoring means includes the weight of the piston.

20. A device according to claim 18, further including variable resistance means, disposed in the path between the input and the piston, for variably constricting the path, and wherein the reference pressure is a pressure of fluid on the side of the variable resistance means opposite the piston.

21. A device for regulating the flow of fluid through a passageway, the device comprising:

a conduit having a wall defining the passageway through the device;

a movably mounted piston having a frontal face, forming a portion of the conduit wall directly exposed to fluid flowing through the passageway, and a distal face exposed to a reference pressure;

an airfoil that is divided into upstream and downstream segments that are displaceable with respect to each other, the airfoil being connected to the piston such that the amount the two segments are displaced with respect to each other varies as a function of the pressure differential across the piston, and such that the airfoil variably impedes fluid flowing through the passageway; and restoring means for exerting a force on the piston so as to tend to cause the airfoil to lessen the impedance on the fluid flow, and so that when there is no flow through the passageway the impedance caused by the airfoil is relatively low.

22. A device according to claim 21, wherein the passageway is in communication with an environment, where the fluid is substantially still, and the reference pressure is equal to the pressure in the environment.

23. A device according to claim 21, wherein the piston and an airfoil segment are attached to each other and move in a direction transverse to the flow of fluid past the impedance means.

24. A device according to claim 21, wherein the piston and the upstream segment are attached to each other and move in a direction transverse to the flow of fluid past the impedance means.

25. A device according to claim 21, wherein the piston is pivotally mounted, and wherein an airfoil segment is hingedly attached to the piston.

26. A device according to claim 25, wherein the piston and the hingedly attached airfoil segment move in a direction transverse to the flow of fluid past the impedance means.

27. A device according to claim 21, wherein the piston is pivotally mounted, and wherein the upstream segment is hingedly attached to the piston.

28. A device according to claim 27, wherein the piston and the upstream segment move in a direction transverse to the flow of fluid past the impedance means.

29. A device according to claim 21, further including a second airfoil that is divided into upstream and downstream segments that are displaceable with respect to each other.

30. A device for regulating the flow of fluid, the device comprising:

a conduit through which the fluid flows;

a first member hingedly mounted so as to rotate about a first pivot point;

a second member having a distal face exposed to a reference pressure, the second member being hingedly mounted so as to rotate about a second pivot point;

impedance means for variably impeding flow through the conduit, the impedance means including movable and fixed portions, the fixed portion being fixedly attached so that it does not move with respect to the conduit, the movable portion being hingedly attached to the first and second members at a points other than the first and second pivot points, so that the movable portion moves as the first and second members moved; and restoring means for exerting a force so as to tend to lessen the impedance on the fluid flow, and so that when there is no flow through the conduit the impedance caused by the impedance means is relatively low.

31. A device according to claim 30, wherein the conduit is in communication with an environment where the fluid is substantially still, and the reference pressure is the pressure of the environment.

32. A device according to claim 30, wherein the first and second members have frontal faces that form a portion of a wall of the conduit exposed directly to flow through the conduit.

33. A device according to claim 30, wherein the first member is mounted above the conduit, and the second member is mounted below the conduit, and the restoring force includes the weight of the first and second members and the movable portion of the impedance means.

34. A device for regulating the flow of fluid, the device comprising:
   a conduit through which the fluid flows;
   a member having a frontal face, exposed to fluid in the conduit, and a distal face exposed to a reference pressure, the member being hingedly mounted so as to rotate about a pivot point, wherein the member has a frontal face that forms a portion of a wall of the conduit exposed directly to flow through the conduit;
   impedance means for variably impeding flow through the conduit, the impedance means including movable and fixed portions, the fixed portion being fixedly attached so that it does not move with respect to the conduit, the movable portion being hingedly attached to the member at a point other than the pivot point, so that the movable portion moves as the member moves; and
   restoring means for exerting a force so as to tend to lessen the impedance on the fluid flow, and so that when there is no flow through the conduit the impedance caused by the impedance means is relatively low.

35. A device for regulating the flow of fluid through a passageway, the device comprising:
   a conduit having a wall defining the passageway through the device;
   a hingedly mounted member having a distal face, exposed to a reference pressure, and a frontal face forming a portion of the conduit wall directly exposed to fluid flowing through the passageway;
   a gate, fixedly attached to the member downstream of the frontal face of the member so that it extends into the passageway, for variably impeding fluid flowing through the passageway at a constriction point, so that the gate's impedance on the fluid flow varies as a function of the pressure differential across the member's frontal and distal faces, the member and gate being mounted so that each moves in a direction transverse to the direction of the fluid through the constriction point; and
   restoring means for exerting a force on the member so as to tend to cause the gate to lessen the impedance on the fluid flow, and so that when there is no flow through the passageway the amount that the gate impedes the flow is relatively low.

36. A device according to claim 35, further including variable resistance means for variably impeding the flow of fluid.

37. A device according to claim 36, wherein the variable resistance means is located upstream of the frontal face of the member, and the reference pressure is the pressure of fluid upstream of the variable resistance means.

38. A device according to claim 35, wherein the passageway is in communication with an environment where the fluid is substantially still, and the reference pressure is the pressure of the environment.

* * * * *

UNITED STATES PATENT AND TRADEMARK OFFICE
CERTIFICATE OF CORRECTION

PATENT NO. : 5,251,654
DATED : October 12, 1993
INVENTOR(S) : Palmer

It is certified that error appears in the above-indentified patent and that said Letters Patent is hereby corrected as shown below:

Col. 8, line 36: "construction" should read "constriction"
Col. 8, line 45: after "impedance" insert --means--.
Col. 10, line 48: "portion" should read "portions".
Col. 11, line 31: after "end" insert --, downstream from the hinge end--.
Col. 13, line 3: after "fluid" insert --flowing from an enviroment, where the fluid is substantially still--.
Col. 13, line 5: after "flows" insert --form the enviroment--.
Col. 13, line 7; after "exposed to" delete "a reference" and insert --the enviroment's--.
Col. 13, line 12: after "conduit" insert --wherein the frontal face is located downstream of the pivot point--.
Col. 13, line 20: after "member moves" insert --, wherein the impedance means is located downstream of the fronatal face--.

Signed and Sealed this

Twentieth Day of September, 1994

Attest:

BRUCE LEHMAN

*Attesting Officer*         *Commissioner of Patents and Trademarks*